July 1, 1947.   L. R. RYAN   2,423,346
CARTRIDGE BELT LINK
Filed March 22, 1943   2 Sheets-Sheet 1

Inventor:
Lester Raymond Ryan
By: Thiess, Olson & Mecklenburger

July 1, 1947.　　　L. R. RYAN　　　2,423,346
CARTRIDGE BELT LINK
Filed March 22, 1943　　　2 Sheets-Sheet 2
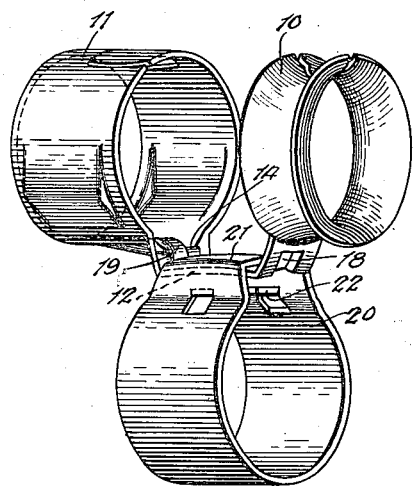
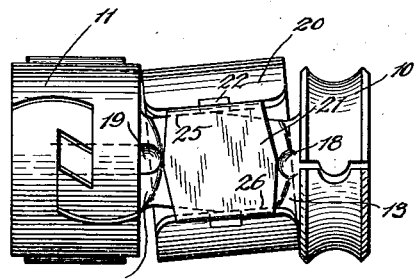
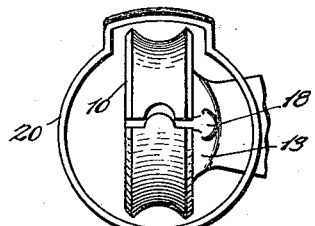
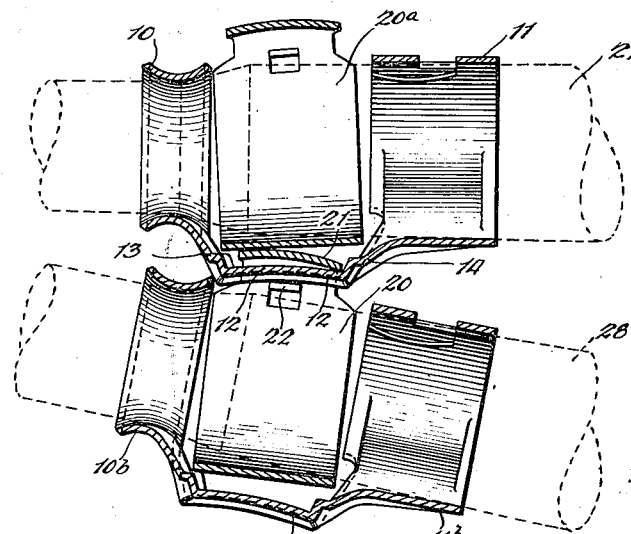

Patented July 1, 1947

2,423,346

UNITED STATES PATENT OFFICE 2,423,346

CARTRIDGE BELT LINK

Lester Raymond Ryan, Plymouth, Conn., assignor to The Autoyre Company, Oakville, Conn., a corporation of Connecticut Application March 22, 1943, Serial No. 480,016

7 Claims. (Cl. 89—35)

This invention relates to cartridge belt links, more particularly to metallic belts of the type wherein the cartridges form the hinge pins or pintles between the successive links of the belt, and the invention has for an object the provision of improved links and belts of this character.

In a copending application of Roy S. Sanford, Serial No. 469,679, filed December 21, 1942, now U. S. Patent No. 2,390,331, issued December 4, 1945, entitled Cartridge belt link, there is disclosed and broadly claimed a two-piece cartridge belt link wherein the two pieces are connected by a mechanical universal joint. The joint is of such a character as to permit sufficient relative tilting and swiveling movement between the two parts of each link and consequently between adjacent cartridges, so that the usual large clearances between the cartridges and the loops of the links may be eliminated while still maintaining sufficient flexibility to meet the standards prescribed for feeding the ammunition to aircraft-mounted machine guns and automatic cannon.

By incorporating in the mechanical joint itself the majority of the necessary tilting and swiveling movement and thus enabling the elimination of the usual large clearances, an ammunition belt formed from the Sanford two-piece links achieves the longitudinal rigidity necessary to prevent excessive stretching and to insure proper feeding of the ammunition under the heavy strains and stresses imposed on the belt by the feeding operation and the maneuvering of the aircraft.

The present invention relates to improvements in swivel type links of the character disclosed in the said Sanford application, and it is a further object of this invention to provide a swivel type link having the necessary tilting and swiveling characteristics and providing increased strength with respect to both torsional forces and longitudinal tensions which may be imposed on the belt.

In carrying out the invention in one form, one of the two pieces comprising the two-piece swivel type link is formed as in the said Sanford link to provide a pair of axially spaced cartridge-receiving loops connected by an integral bridge portion, and the second piece of the link is shaped to form a single cartridge-receiving loop which, when assembled with the first piece, encircles the bridge portion. More particularly, the second piece comprises a single loop having a neck portion extending from one side thereof for receiving the bridge portion of the other piece in nesting relation, with sufficient clearance between the edges of the bridge portion and the sides of the neck portion to permit the desired amount of swiveling of the single loop on the bridge portion. Means extending inwardly from the opposite sides of the neck portion overlie the bridge portion so as to maintain the two pieces in interlinked relation, and sufficient clearance is left between the overlying means and the bridge portion to permit the desired amount of tilting between the single loop and the bridge portion.

The term "swiveling" as used in this application is intended to mean the relative movement between adjacent parts or cartridges which is necessary to permit the belt to be twisted into a helix within a prescribed number of rounds, and the term "tilting" is intended to mean the relative movement between adjacent parts or cartridges in the belt necessary to permit the belt to be bent into a circle of prescribed radius, with either the tips of the bullets or the percussion ends of the cartridges pointing toward the center of the circle.

For a more complete understanding of the invention, reference should now be had to the drawings in which:

Fig. 8 is a perspective view of an assembled link made up of the two parts illustrated in Figs. 1 to 7;

Fig. 9 is a fragmentary view showing the manner in which the two parts are assembled to form the two-piece link;

Fig. 10 is a top view of the assembled link showing the manner in which the two parts thereof may be twisted or swiveled to form a helix;

Fig. 11 is a sectional view through a portion of an assembled belt showing the manner in which the two parts of the links and the adjacent cartridges may be tilted to form a circle, with the noses of the bullets pointing toward the center;

Figure 1:
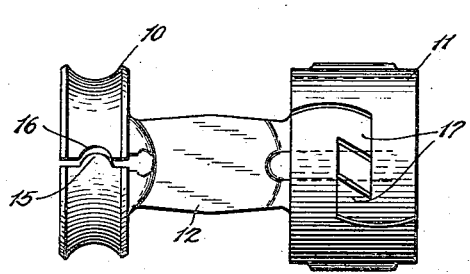
Fig. 1 is a top plan view of one part of a two-piece link embodying the present invention.
Figure 2:
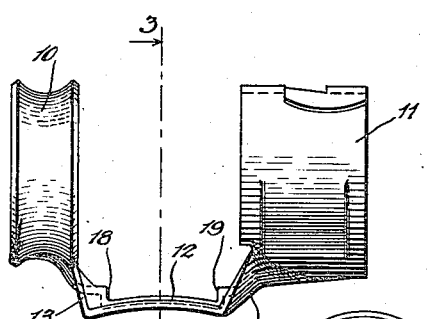
Fig. 2 is a side view of the part shown in Fig. 1.
Figure 3:
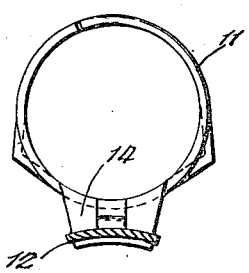
Fig. 3 is a sectional view along the line 3—3 of Fig. 2.

Referring now to Figs. 1 to 11 of the drawings, the double-loop part of the link, as shown in Figs. 1 to 3, inclusive, comprises a pair of spaced loops 10 and 11 connected by an integral bridge portion 12 which extends between the two loops at one side thereof and is connected to the respective loops by reinforced connecting portions 13 and 14, respectively. The loops 10 and 11 may be of any desired character, but are preferably of the type disclosed in the said Sanford application, the loop 10 being split and provided with a centering lug 15 extending into a notch 16, and the loop 11 also being of the split expansible type and having hook-shaped end portions 17 for limiting, to a predetermined amount, the expansion of the loop 11 when a cartridge is inserted therethrough.

The reinforcements in the connecting portions 13 and 14 are formed, as shown best in Fig. 2, to provide shoulders 18 and 19 for centering the single-loop part of the link when the two parts are assembled in the manner to be described hereinafter. The center portion 12 of the bridge is curved longitudinally, as shown in Fig. 2, and transversely, as shown in Fig. 3, so as to provide a surface of revolution on which a corresponding part of the single loop will rest when the link is assembled.

Figure 4:
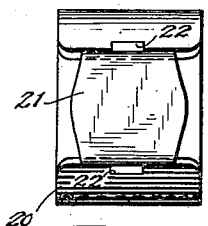
Fig. 4 is a top plan view of the second part employed in the two-piece swivel type link embodying the present invention.
Figure 5:
Fig. 5 is a side elevational view of the second part shown in Fig. 4.
Figure 7:
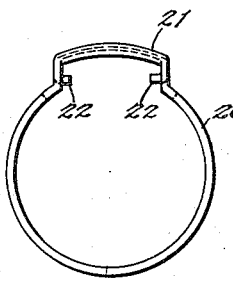
Fig. 7 is an end view of the part shown in Fig. 4 with the retaining fingers or means bent inwardly.
Figure 6:
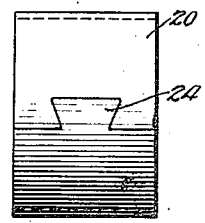
Fig. 6 is a bottom view of the part shown in Fig. 4.

The second part of the link, as shown best in Figs. 4 to 7, comprises merely a single loop 20 which is formed at one side to provide an outwardly extending neck portion 21 having tapering edges, as shown best in Fig. 4. Adjacent the legs of the neck portion 21, the loop 20 is slit or sheared to provide suitable lugs 22 which, after assembly of the two parts of the link, may be bent inwardly as shown in Fig. 7. Although the single loop 20 may be formed in any desired manner, it preferably constitutes a single strip of material, the neck portion 21 being formed centrally of the strip and the opposite ends being bent around into engagement with each other and locked, as for example by the dovetail lock 24 shown in Fig. 6. As indicated in Figs. 5 and 7, the yoke portion of the U-shaped neck 21 is curved both longitudinally and transversely to provide a surface of revolution corresponding to the bridge portion 12 on the other part of the link.

In Fig. 8 a link is shown with the two parts in assembled relation and the stop fingers 22 bent inwardly so as to prevent separation or dislocation of the two parts. Assembly of the link may be accomplished, as shown in Fig. 9, merely by passing the single loop 20 over the smaller loop 10 of the other part, the combined width of the loop 20 and the neck portion 21 being greater than the external diameter of the loop 10. After the loop 20 has been passed over the loop 10 to a position wherein it encircles the bridge portion 12, it may be turned to the desired position, so that the bridge portion nests within the neck portion, and the fingers 22 pressed inwardly so as to extend beneath the bridge portion 12.

Preferably, the spaced loops 10 and 11 are so proportioned that when a cartridge is inserted the smaller loop 10 will engage the usual tapering shoulder which connects the smaller and larger diameter portions of the cartridge, and the large loop 11 tightly and frictionally grips the large diameter portion of the cartridge. The single loop 20 is preferably of such a diameter as to provide a slight clearance between its interior surface and the exterior of the portion of the cartridge which extends therethrough. In assembling the links into a belt, the single loop of one link will be inserted between the spaced loops of the next adjacent link prior to the insertion of a cartridge, so that the cartridge will form the hinge pin or pintle connecting the adjacent links.

As shown in Fig. 10, when the two parts of the improved link are assembled, the neck portion 21 of the single loop 20 lies between the shoulders 18 and 19 on the connecting portions 13 and 14 which join the bridge portion 12 to the loops 10 and 11 respectively. Only a slight clearance is provided between the point of maximum width on the neck portion 21 and the shoulders 18 and 19, so that the single loop part is restrained against excessive longitudinal movement. At the same time, however, relative swiveling movement between the two parts may be effected.

In Fig. 10 the two parts are shown in the position of maximum twist or swivel, the respective edges of the bridge portion 12 and the legs of the neck portion 21 engaging at the points indicated by reference numerals 25 and 26 to positively limit and prevent further swiveling. Preferably, the parts are so dimensioned that the amount of swiveling illustrated in Fig. 10 plus the relatively small amount of movement which may occur between the cartridge and the single loop, due to the above-mentioned clearance therebetween, will combine to provide a sufficient swiveling to permit the belt to be twisted into a 90° helix within the desired number of rounds. If desired, the reinforcing shoulders 18 and 19 may be omitted and the connecting portions 13 and 14 formed so as to provide spaced apart shoulders which extend entirely across the width of the bridge portion 12. With this arrangement swiveling of the two parts of the link may still be accomplished due to the fact that the edges of the bridge portion 21 are tapered as heretofore described.

In Fig. 11 a portion of an assembled belt is shown to illustrate the manner in which tilting between the two parts of each link is effective to permit bending the belt into a circle, with the tips of the bullets pointing toward the center of the circle. Two cartridges 27 and 28 are illustrated, the cartridge 27 being inserted through the spaced loops 10 and 11 of one link and through the single loop 20a of the next preceding link, the double-loop part which would normally be assembled with the single loop 20a being omitted in order to simplify the drawing. The cartridge 28 extends through the single loop 20 which is assembled, as previously described in connection with Fig. 8, so that its neck portion 21 encircles the bridge portion 12 extending between the loops 10 and 11. As shown, the single loop 20 lies between the spaced loops 10b and 11b of an adjacent link through which the cartridge 28 also extends, the single loop part, which would normally be assembled with the loops 10b and 11b, so as to encircle the bridge portion 12b extending therebetween, being omitted in order to simplify the drawing.

As shown in Fig. 11, the cartridges 27 and 28 may be tilted at an appreciable angle to each other, each of the cartridges tilting slightly relative to its associate single loop due to the small clearance therebetween, but the major portion of the tilting being accomplished by the relative tilting of the single loop 20 with respect to the double-loop parts on which they are assembled. In the maximum tilted position shown in Fig. 11, the right-hand edge of the neck portion 21 bears against the right-hand end of the bridge portion 12, and the opposite edges of the bridge portion 12 bear against the inwardly extending fingers 22. The connecting portions 13 and 14 are preferably so proportioned that the left-hand edge of the neck portion 21 on one of the single loops will not engage, although it closely approaches the next adjacent single loop.

Figure 13:
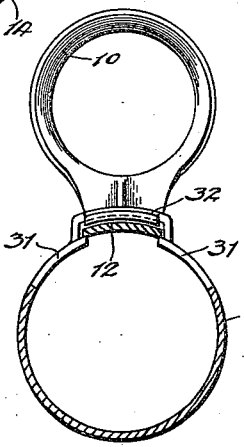
Fig. 13 is a sectional view taken along the line 13—13 of Fig. 12.
Figure 12:
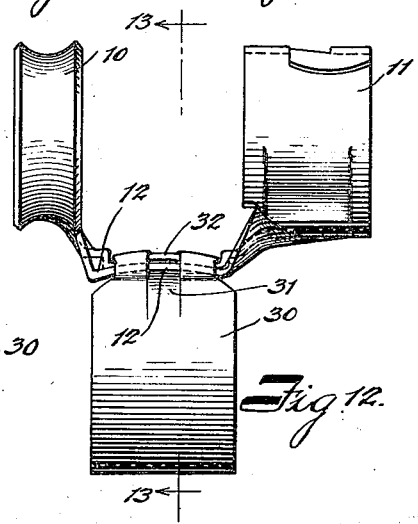
Fig. 12 is an elevational view of a two-piece link constituting another embodiment of the invention.

In the embodiment of the invention shown in Figs. 12 and 13, additional advantages are obtained in that all of the forming operations are carried out prior to assembly of the two parts, and locking of the two parts in assembled relation is automatically effected by spring fingers which permit ready assembly but restrain the assembled parts against disassembly. As shown in Figs. 12 and 13, the double loop part of the link is identical to the previously described embodiment and includes spaced loops 10 and 11 connected by a bridge portion 12. The single loop 30, however, is provided with a pair of spring fingers 31 the inner ends of which project from the sides of the U-shaped neck portion.

When the two parts of the link are assembled the bridge portion 12 is forced downwardly into the neck portion of the loop 30 so as to force the spring fingers 31 outwardly, and as soon as the bridge portion passes beyond the ends of the fingers, the fingers will spring back to the position shown best in Fig. 13 so as to overlie the edges of the bridge portion and retain the two parts in assembled relation.

Although the spring fingers 31 may be formed in any suitable manner, they are preferably formed by slitting the material of the loop 30, and in order to insure that the spring fingers will be free to flex throughout the length thereof the yoke portion of the U-shaped neck of the loop 30 is swaged directly opposite the fingers at the point indicated by the reference numeral 32, so as to spread the portions of the loop on opposite sides of the spring fingers and provide additional clearance along the edges thereof.

It will now be apparent that a two-piece cartridge belt link, when constructed as herein described, is composed of a pair of interlinked parts so related as to permit tilting and swiveling movement between the parts and at the same time provides a construction which is exceptionally strong both as to torsional stresses, which arise when an attempt is made to twist the belt beyond its permissible limits, i. e., beyond the point of maximum twist shown in Fig. 10, and against tensional forces which occur during the feeding movement and which tend to pull the two parts of the link apart. Separation of the two parts of the link, due to tensional forces, could occur only if these forces are sufficiently strong to break the loops themselves or the connecting bridge portions, and the torsional forces are of course resisted by the entire cross sections of the neck portions 21 and the bridge portions 12.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A cartridge belt link comprising a first part having a pair of cartridge-receiving axially spaced loops, a bridge member integral with and connecting said loops, and a second part shaped to form a single cartridge-receiving loop encircling said bridge portion, said single loop having a substantially U-shaped neck portion extending from one side thereof for receiving said bridge portion in nesting relation, and means extending inwardly from the opposed legs of said U-shaped neck portion in overlying relation to said bridge portion for retaining said bridge portion in said nesting relation.

2. A cartridge belt link comprising a first part having a pair of cartridge-receiving axially spaced loops, a bridge member integral with and connecting said loops, and a second part shaped to form a single cartridge-receiving loop encircling said bridge portion, said single loop having a substantially U-shaped neck portion extending from one side thereof for receiving said bridge portion in nesting relation, and a finger extending inwardly from each side of said U-shaped neck portion centrally thereof for restraining said bridge portion in said nesting relation, said fingers being spaced from the yoke of said U a distance greater than the thickness of said bridge portion to provide clearance for limited tilting of said single loop on said bridge portion.

3. A cartridge belt link comprising a first part having a pair of cartridge-receiving axially spaced loops, a bridge member integral with and connecting said loops, and a second part shaped to form a single cartridge-receiving loop encircling said bridge portion, said single loop having a substantially U-shaped neck portion extending from one side thereof for receiving said bridge portion in nesting relation, and resilient means on said U-shaped portion for retaining said parts in assembled relation, said means being yieldable in one direction to permit insertion of said bridge portion into said neck portion.

4. A cartridge belt link comprising a first part having a pair of cartridge-receiving axially spaced loops, a bridge member integral with and connecting said loops, and a second part shaped to form a single cartridge-receiving loop encircling said bridge portion, said single loop having a substantially U-shaped neck portion extending from one side thereof for receiving said bridge portion in nesting relation, and means including a spring finger extending inwardly from one side of said neck portion for retaining said bridge portion in said nesting relation, said finger being yieldable to permit passage of said bridge portion into said nesting relation and to thereafter overlie said bridge portion in retaining relation thereto.

5. A cartridge belt link comprising a first part having a pair of cartridge-receiving axially spaced loops, a bridge member integral with and connecting said loops, and a second part shaped to form a single cartridge-receiving loop encircling said bridge portion, said single loop having a substantially U-shaped neck portion extending from one side thereof for receiving said bridge portion in nesting relation, and a pair of spring fingers extending inwardly from opposite sides of said neck portion, said fingers being yieldable to permit passage of said bridge portion into said nesting relation, said fingers thereafter automatically returning to a position overlying said bridge portion to retain said bridge portion in said nesting relation.

6. A cartridge belt link comprising a first part having a pair of cartridge-receiving axially spaced loops, a bridge member integral with and connecting said loops, and a second part shaped to form a single cartridge-receiving loop encircling said bridge portion, said single loop having a substantially U-shaped neck portion extending from one side thereof for receiving said bridge portion in nesting relation, and means extending inwardly from the opposed legs of said U-shaped neck portion in overlying relation to said bridge portion for retaining said bridge portion in said nesting relation, said means including a spring finger yieldable in one direction to permit insertion of said bridge portion into said neck portion.

7. A cartridge belt link comprising a first part having two axially spaced cartridge receiving loops, a bridge member integral with and connecting said loops at the periphery thereof, a first surface of revolution formed on said bridge member, and a second part shaped to form a single cartridge receiving loop, said single loop being provided with a substantially U-shaped neck portion extending from one side thereof to receive said bridge member in nesting relationship, said U-shaped neck including a second surface of revolution interfitting with said first surface of revolution to facilitate twisting and tilting of said single loop on said bridge portion.

LESTER RAYMOND RYAN.

REFERENCES CITED

The following references are of record in the file of this patent:

UNITED STATES PATENTS

| Number | Name | Date |
|---|---|---|
| 2,352,954 | Higson | July 4, 1944 |
| 2,353,632 | Borton | July 18, 1944 |

FOREIGN PATENTS

| Number | Country | Date |
|---|---|---|
| 527,157 | Great Britain | Oct. 3, 1940 |
| 355,767 | Great Britain | Feb. 21, 1930 |
| 775,551 | France | Oct. 15, 1934 |
| 543,842 | Great Britain | Mar. 16, 1942 |